United States Patent
Karschnia et al.

(10) Patent No.: US 7,957,708 B2
(45) Date of Patent: Jun. 7, 2011

(54) PROCESS DEVICE WITH IMPROVED POWER GENERATION

(75) Inventors: Robert J. Karschnia, Chaska, MN (US); Marcos Peluso, Chanhassen, MN (US); Adrian C. Toy, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 882 days.

(21) Appl. No.: 11/070,860

(22) Filed: Mar. 2, 2005

(65) Prior Publication Data

US 2005/0208908 A1 Sep. 22, 2005

Related U.S. Application Data (60) Provisional application No. 60/549,637, filed on Mar. 2, 2004.

(51) Int. Cl.
*H01Q 11/12* (2006.01)
*H04B 5/00* (2006.01)
*G08B 1/08* (2006.01)

(52) U.S. Cl. .................. 455/127.1; 455/127.5; 455/128; 455/343.1; 455/574

(58) Field of Classification Search .............. 455/127.1, 455/90.3, 550.1, 572–575.1, 333, 343.1, 455/343.6, 344, 347, 423, 127.5, 128, 574; 340/539.26, 442, 447, 545.5, 539.29, 506, 340/870.01, 870.16; 136/205, 211–212; 369/13.25; 438/50, 706; 257/E21.613; 374/148, 374/163, 183, 208

See application file for complete search history.

(56) References Cited

U.S. PATENT DOCUMENTS

| | | | |
|---|---|---|---|
| 2,883,489 A | 4/1959 | Eadie, Jr. et al. | 335/148 |
| 3,229,759 A | 1/1966 | Grover et al. | 165/105 |
| 3,232,712 A | 2/1966 | Stearns | 23/255 |
| 3,568,762 A | 3/1971 | Harbaugh | 165/105 |
| 3,612,851 A | 10/1971 | Fowler | 362/30 |
| D225,743 S | 1/1973 | Seltzer | D10/102 |
| 3,881,962 A | 5/1975 | Rubinstein | 136/209 |
| 3,931,532 A | 1/1976 | Byrd | 310/4 |
| 4,026,348 A | 5/1977 | Roberts, Jr. | 165/272 |
| 4,042,757 A | 8/1977 | Jones | 429/104 |
| 4,125,122 A | 11/1978 | Stachurski | 136/205 |
| 4,322,724 A | 3/1982 | Grudzinski | 340/595 |
| 4,370,890 A | 2/1983 | Frick | 73/18 |

(Continued)

FOREIGN PATENT DOCUMENTS

CH   672 368 A5   11/1989

(Continued)

OTHER PUBLICATIONS

Examination Report of the European Patent Office in counterpart foreign application No. 05724190.3 filed Mar. 2, 2005.

(Continued)

*Primary Examiner* — Pablo N Tran
(74) *Attorney, Agent, or Firm* — Westman, Champlin & Kelly, P.A.; Christopher R. Christenson (57) ABSTRACT

A wireless field device is disclosed. The field device includes a wireless communications module and an energy conversion module. The wireless communications module is configured to wirelessly communicate process-related information with another device. The energy conversion module is coupled to the wireless communications module. The energy conversion module is configured to couple to a thermal source, and to generate electricity from thermal potential energy in the thermal source.

17 Claims, 7 Drawing Sheets

U.S. PATENT DOCUMENTS

| | | |
|---|---|---|
| 4,383,801 A | 5/1983 | Pryor .................................. 416/17 |
| 4,389,895 A | 6/1983 | Rud, Jr. ............................... 73/724 |
| 4,475,047 A | 10/1984 | Ebert, Jr. ............................. 307/66 |
| 4,476,853 A | 10/1984 | Arbogast ........................... 126/578 |
| 4,485,670 A | 12/1984 | Camarda et al. ................... 73/179 |
| 4,590,466 A | 5/1986 | Wiklund et al. ............. 340/870.28 |
| 4,639,542 A | 1/1987 | Bass et al. ........................ 136/210 |
| 4,651,019 A | 3/1987 | Gilbert et al. ....................... 307/43 |
| 4,704,607 A | 11/1987 | Teather et al. ............... 340/825.07 |
| 4,749,993 A | 6/1988 | Szabo et al. ................ 340/870.31 |
| 4,860,232 A | 8/1989 | Lee et al. ..................... 364/571.04 |
| 4,878,012 A | 10/1989 | Schulte et al. ....................... 324/60 |
| 4,977,480 A | 12/1990 | Nishihara ............................ 73/724 |
| 4,982,412 A | 1/1991 | Gross .................................... 377/6 |
| 5,025,202 A | 6/1991 | Ishii et al. ............................ 320/32 |
| 5,062,442 A | 11/1991 | Stenstrom et al. ............... 137/110 |
| 5,094,109 A | 3/1992 | Dean et al. .......................... 73/718 |
| D331,370 S | 12/1992 | Williams ............................ D10/46 |
| D345,107 S | 3/1994 | Williams ............................ D10/46 |
| 5,313,831 A * | 5/1994 | Beckman ........................ 73/204.24 |
| 5,329,818 A | 7/1994 | Frick et al. .......................... 73/708 |
| 5,412,535 A | 5/1995 | Chao et al. ......................... 361/700 |
| 5,495,769 A | 3/1996 | Broden et al. ....................... 73/18 |
| 5,506,757 A | 4/1996 | Brorby ............................... 361/796 |
| 5,531,936 A | 7/1996 | Kanatzidis et al. ............... 252/587 |
| 5,554,809 A | 9/1996 | Tobita et al. ....................... 73/700 |
| 5,606,513 A | 2/1997 | Louwagie et al. ................ 702/138 |
| 5,614,128 A | 3/1997 | Kanatzidis et al. ............... 252/582 |
| 5,618,471 A | 4/1997 | Kanatzidis et al. ............... 252/582 |
| 5,637,802 A | 6/1997 | Frick et al. .......................... 73/724 |
| 5,642,301 A | 6/1997 | Warrior et al. .............. 364/571.02 |
| 5,644,185 A | 7/1997 | Miller ................................ 310/306 |
| 5,656,782 A | 8/1997 | Powell, II et al. ................. 73/756 |
| 5,665,899 A | 9/1997 | Willcox ........................... 731/1.63 |
| 5,682,476 A | 10/1997 | Tapperson et al. ......... 395/200.05 |
| 5,705,978 A | 1/1998 | Frick et al. ........................ 340/511 |
| 5,722,249 A | 3/1998 | Miller, Jr. .......................... 62/238.2 |
| 5,793,963 A | 8/1998 | Tapperson et al. ......... 395/200.31 |
| 5,803,604 A * | 9/1998 | Pompei ............................. 374/181 |
| 5,811,201 A | 9/1998 | Skowronski ........................ 429/17 |
| 5,851,083 A | 12/1998 | Palan ................................. 403/337 |
| 5,870,695 A | 2/1999 | Brown et al. ..................... 702/138 |
| 5,872,494 A | 2/1999 | Palan et al. ....................... 333/252 |
| 5,899,962 A | 5/1999 | Louwagie et al. ................ 702/138 |
| 5,929,372 A | 7/1999 | Oudoire et al. .................... 136/208 |
| 5,954,526 A | 9/1999 | Smith ................................ 439/136 |
| 5,978,658 A | 11/1999 | Shoji .................................... 455/66 |
| 6,013,204 A | 1/2000 | Kanatzidis et al. ............... 252/584 |
| 6,079,276 A | 6/2000 | Frick et al. ............................ 73/18 |
| 6,127,739 A | 10/2000 | Appa .................................... 290/55 |
| 6,255,010 B1 | 7/2001 | George et al. ....................... 429/30 |
| 6,282,247 B1 * | 8/2001 | Shen .................................. 375/285 |
| 6,295,875 B1 | 10/2001 | Frick et al. .......................... 73/718 |
| 6,312,617 B1 | 11/2001 | Kanatzidis et al. .............. 252/62.3 |
| 6,326,764 B1 | 12/2001 | Virtudes ............................ 320/101 |
| 6,338,283 B1 | 1/2002 | Blazquez Navarro ........... 73/865.8 |
| 6,360,277 B1 | 3/2002 | Ruckley et al. ................... 709/250 |
| 6,385,972 B1 * | 5/2002 | Fellows ............................... 60/517 |
| 6,405,139 B1 | 6/2002 | Kicinski et al. ..................... 702/33 |
| 6,441,747 B1 | 8/2002 | Khair et al. .................. 340/870.16 |
| 6,480,699 B1 * | 11/2002 | Lovoi ............................... 455/41.2 |
| 6,508,131 B2 | 1/2003 | Frick ................................... 73/756 |
| 6,574,515 B1 | 6/2003 | Kirkpatrick et al. .............. 700/19 |
| 6,667,594 B2 | 12/2003 | Chian ................................ 318/696 |
| 6,711,446 B2 | 3/2004 | Kirkpatrick et al. .............. 700/19 |
| 6,744,814 B1 | 6/2004 | Blanksby et al. ................. 375/232 |
| 6,747,573 B1 * | 6/2004 | Gerlach et al. ............. 340/870.21 |
| 6,778,100 B2 | 8/2004 | Schempf .................... 340/870.07 |
| 6,792,259 B1 * | 9/2004 | Parise ............................... 455/343.1 |
| 6,838,859 B2 | 1/2005 | Shah ................................... 322/38 |
| 6,839,546 B2 | 1/2005 | Hedtke ............................. 455/67.11 |
| 6,843,110 B2 * | 1/2005 | Deane et al. ................... 73/114.35 |
| 6,891,477 B2 | 5/2005 | Aronstam .......................... 340/606 |
| 6,891,838 B1 | 5/2005 | Petite et al. ....................... 370/401 |
| 6,904,295 B2 * | 6/2005 | Yang .................................. 455/522 |
| 6,907,383 B2 | 6/2005 | Eryurek et al. ................... 702/183 |
| 6,910,332 B2 * | 6/2005 | Fellows ............................... 60/520 |
| 6,942,728 B2 | 9/2005 | Caillat et al. ......................... 117/3 |
| 6,984,899 B1 | 1/2006 | Rice .................................... 290/44 |
| 6,995,677 B2 | 2/2006 | Aronstam et al. ................ 340/606 |
| 6,995,685 B2 | 2/2006 | Randall ...................... 340/870.39 |
| 7,010,294 B1 | 3/2006 | Pyotsia et al. .................... 455/420 |
| 7,036,983 B2 * | 5/2006 | Green et al. ...................... 374/179 |
| 7,058,542 B2 | 6/2006 | Hauhia et al. .................... 702/183 |
| 7,173,343 B2 | 2/2007 | Kugel ............................... 290/1 R |
| 7,197,953 B2 * | 4/2007 | Olin ................................. 73/866.5 |
| 7,233,745 B2 | 6/2007 | Loechner ......................... 398/128 |
| 7,262,693 B2 | 8/2007 | Karschnia et al. ................ 340/508 |
| 7,271,679 B2 | 9/2007 | Lundberg et al. .............. 333/24 C |
| 7,301,454 B2 * | 11/2007 | Seyfang et al. ............ 340/539.26 |
| 7,329,959 B2 * | 2/2008 | Kim et al. ............................. 290/2 |
| 2001/0025349 A1 | 9/2001 | Sharood et al. .................. 713/340 |
| 2002/0029130 A1 | 3/2002 | Eryurek et al. ................... 702/183 |
| 2002/0065631 A1 | 5/2002 | Loechner ......................... 702/188 |
| 2002/0095520 A1 | 7/2002 | Wettstein et al. ................ 709/253 |
| 2002/0097031 A1 | 7/2002 | Cook et al. ....................... 323/273 |
| 2002/0105968 A1 | 8/2002 | Pruzan et al. .................... 370/465 |
| 2002/0148236 A1 | 10/2002 | Bell ..................................... 62/3.3 |
| 2002/0163323 A1 | 11/2002 | Kasai et al. ....................... 323/284 |
| 2003/0000681 A1 | 1/2003 | Reisfeld ...................... 165/104.26 |
| 2003/0012563 A1 | 1/2003 | Neugebauer et al. ......... 126/85 R |
| 2003/0030537 A1 | 2/2003 | Kogure .............................. 340/3.5 |
| 2003/0042740 A1 | 3/2003 | Holder et al. .................... 290/1 A |
| 2003/0043052 A1 | 3/2003 | Tapperson et al. ........ 340/825.37 |
| 2003/0079553 A1 * | 5/2003 | Cain et al. ..................... 73/861.27 |
| 2003/0097521 A1 | 5/2003 | Pfandler et al. ................. 711/103 |
| 2003/0134161 A1 | 7/2003 | Gore et al. .......................... 429/12 |
| 2003/0143958 A1 * | 7/2003 | Elias et al. ............................ 455/73 |
| 2003/0171827 A1 | 9/2003 | Keyes, IV et al. ................. 700/19 |
| 2003/0204371 A1 | 10/2003 | Sciamanna ...................... 702/183 |
| 2004/0033704 A1 | 2/2004 | Selli et al. ............................ 439/8 |
| 2004/0081872 A1 | 4/2004 | Herman et al. .................... 429/26 |
| 2004/0086021 A1 | 5/2004 | Litwin .............................. 374/120 |
| 2004/0142733 A1 * | 7/2004 | Parise ................................ 455/572 |
| 2004/0159235 A1 * | 8/2004 | Marganski et al. ................. 95/116 |
| 2004/0199681 A1 | 10/2004 | Hedtke ................................ 710/37 |
| 2004/0200519 A1 | 10/2004 | Sterzel et al. .................... 136/238 |
| 2004/0203434 A1 | 10/2004 | Karschnia et al. ............. 455/67.11 |
| 2004/0211456 A1 | 10/2004 | Brown et al. .................... 136/243 |
| 2004/0214543 A1 * | 10/2004 | Osone et al. ................... 455/197.2 |
| 2004/0242169 A1 * | 12/2004 | Albsmeier et al. ................. 455/91 |
| 2004/0249483 A1 | 12/2004 | Wojsznis et al. ................... 700/52 |
| 2004/0259533 A1 | 12/2004 | Nixon et al. .................... 455/414.1 |
| 2005/0023858 A1 * | 2/2005 | Bingle et al. ....................... 296/76 |
| 2005/0029236 A1 * | 2/2005 | Gambino et al. ............ 219/121.69 |
| 2005/0046595 A1 | 3/2005 | Blyth ................................ 340/908 |
| 2005/0072239 A1 | 4/2005 | Longsdorf et al. ................ 73/649 |
| 2005/0074324 A1 | 4/2005 | Yoo .................................... 415/4.3 |
| 2005/0076944 A1 | 4/2005 | Kanatzidis et al. ............... 136/239 |
| 2005/0078451 A1 | 4/2005 | Sauciuc et al. ................... 361/700 |
| 2005/0082949 A1 | 4/2005 | Tsujiura ............................ 310/339 |
| 2005/0115601 A1 * | 6/2005 | Olsen et al. ...................... 136/212 |
| 2005/0118468 A1 | 6/2005 | Adams et al. ....................... 429/22 |
| 2005/0122653 A1 | 6/2005 | McCluskey et al. .............. 361/92 |
| 2005/0130605 A1 | 6/2005 | Karschnia et al. ............. 455/90.3 |
| 2005/0139250 A1 | 6/2005 | DeSteese et al. ................ 136/212 |
| 2005/0164684 A1 | 7/2005 | Chen et al. ....................... 455/414 |
| 2005/0182501 A1 | 8/2005 | Franchuk et al. ................... 700/81 |
| 2005/0201349 A1 | 9/2005 | Budampati ....................... 370/342 |
| 2005/0208908 A1 | 9/2005 | Karschnia et al. ............ 455/127.1 |
| 2005/0222698 A1 | 10/2005 | Eryurek et al. ................... 700/90 |
| 2005/0245291 A1 | 11/2005 | Brown et al. ..................... 455/572 |
| 2005/0276233 A1 | 12/2005 | Shepard et al. .................. 370/254 |
| 2005/0281215 A1 | 12/2005 | Budampati et al. .............. 370/328 |
| 2005/0289276 A1 | 12/2005 | Karschnia et al. ............... 710/305 |
| 2006/0002368 A1 | 1/2006 | Budampati et al. .............. 370/351 |
| 2006/0036404 A1 | 2/2006 | Wiklund et al. .................. 702/183 |
| 2006/0060236 A1 | 3/2006 | Kim et al. ......................... 136/203 |
| 2006/0063522 A1 * | 3/2006 | McFarland ...................... 455/423 |
| 2006/0077917 A1 | 4/2006 | Brahmajosyula et al. ..... 370/310 |
| 2006/0092039 A1 | 5/2006 | Saito et al. .................. 340/825.37 |
| 2006/0128689 A1 | 6/2006 | Gomtsyan et al. ......... 514/217.01 |
| 2006/0148410 A1 | 7/2006 | Nelson et al. ................. 455/67.11 |
| 2006/0181406 A1 | 8/2006 | Petite et al. ...................... 340/521 |
| 2006/0227729 A1 | 10/2006 | Budampati et al. ............. 370/278 |
| 2006/0266404 A1 | 11/2006 | Hiller et al. ...................... 136/205 |
| 2006/0274644 A1 | 12/2006 | Budampati et al. ............. 370/216 |

| | | | |
|---|---|---|---|
| 2006/0274671 A1 | 12/2006 | Budampati et al. | 370/254 |
| 2006/0287001 A1 | 12/2006 | Budampati et al. | 455/552.1 |
| 2007/0006528 A1* | 1/2007 | Diebold et al. | 48/197 R |
| 2007/0030816 A1 | 2/2007 | Kolavennu | 370/252 |
| 2007/0030832 A1 | 2/2007 | Gonia et al. | 370/338 |
| 2007/0054630 A1* | 3/2007 | Scheible et al. | 455/90.3 |
| 2007/0135867 A1 | 6/2007 | Klosterman et al. | 607/60 |
| 2007/0229255 A1 | 10/2007 | Loechner | 340/540 |
| 2007/0233283 A1 | 10/2007 | Chen | 700/17 |
| 2007/0237137 A1 | 10/2007 | McLaughlin | 370/389 |
| 2007/0275755 A1* | 11/2007 | Chae et al. | 455/557 |
| 2008/0010600 A1 | 1/2008 | Katano | 715/748 |
| 2008/0083446 A1* | 4/2008 | Chakraborty et al. | 136/205 |
| 2008/0141769 A1* | 6/2008 | Schmidt et al. | 73/204.19 |

FOREIGN PATENT DOCUMENTS

| | | |
|---|---|---|
| CN | 06 199284 A | 7/1994 |
| CN | 1251953 | 5/2000 |
| CN | 1429354 | 7/2003 |
| CN | 1442822 | 9/2003 |
| DE | 3340834 A1 | 5/1985 |
| DE | 196 08 310 | 7/1997 |
| DE | 201 07 112 U1 | 7/2001 |
| DE | 101 04 582 A1 | 10/2001 |
| DE | 101 28 447 | 1/2003 |
| EP | 0 524 550 A1 | 1/1993 |
| EP | 1 202 145 | 5/2002 |
| EP | 1 293 853 | 3/2003 |
| EP | 1 482 568 A2 | 12/2004 |
| GB | 1 397 435 A | 6/1975 |
| GB | 2 145 876 A | 4/1985 |
| GB | 2293446 A | 3/1996 |
| GB | 2 310 498 | 8/1997 |
| GB | 2 320 733 A | 7/1998 |
| JP | 59-075684 | 4/1984 |
| JP | 60-125181 | 7/1985 |
| JP | 61-154087 | 7/1986 |
| JP | 1028418 | 1/1989 |
| JP | 02 067794 | 3/1990 |
| JP | 11-036981 | 2/1999 |
| JP | 11-215867 | 8/1999 |
| JP | 2000-321361 | 11/2000 |
| JP | 2001-222787 | 8/2001 |
| JP | 2002-048618 | 2/2002 |
| JP | 2002-369554 | 12/2002 |
| JP | 2003051894 | 2/2003 |
| JP | 2003-113850 | 4/2003 |
| JP | 2003134261 | 5/2003 |
| JP | 2003-168182 | 6/2003 |
| JP | 2004021877 | 1/2004 |
| JP | 2004208476 A | 7/2004 |
| JP | 2005-72080 | 3/2005 |
| RU | 1813916 A1 | 7/1993 |
| RU | 2 131 934 C1 | 6/1999 |
| RU | 2168062 C1 | 5/2001 |
| RU | 2003128989 | 1/2007 |
| SU | 1746056 | 7/1992 |
| WO | WO 88/05964 | 8/1988 |
| WO | WO 91/11029 | 7/1991 |
| WO | WO 95/07522 | 3/1995 |
| WO | WO 99/53286 | 10/1999 |
| WO | WO 03/023536 | 3/2003 |
| WO | WO 03/089881 | 10/2003 |
| WO | WO 2004/059139 | 7/2004 |
| WO | WO 2004/082051 | 9/2004 |
| WO | WO 2004/094892 | 11/2004 |
| WO | WO 2005/086331 | 9/2005 |
| WO | WO 2006/109362 | 10/2006 |
| WO | WO 2005/060482 | 7/2007 |

OTHER PUBLICATIONS

International Search Report and Written Opinion in Application No. PCT/US2006/035728, filed Sep. 13, 2006.
International Search Report and Written Opinion of Application No. PCT/US2005/015848, file May 5, 2005.
International Search Report and Written Opinion in Appln No: PCT/US2005/021757, filed Jun. 21, 2005.
Notification of Transmittal of the International Search Report or the Declaration- PCT/US03/10403.
"Wireless R&D Aims to Boost Traffic", by M. Moore, *InTech with Industrial Computing*, Feb. 2002, 3 pgs.
"System Checks Faraway Machines' Health", by J. Strothman, *InTech with Industrial Computing*, Feb. 2002, 1 pg.
"Wireless Management Toolkit XYR 5000", by Honeywell International Inc., Phoenix, Arizona, 3 pgs., Oct. 2003.
"Wireless Analog Input Transmitters XYR 5000", by Honeywell International Inc., Phoenix, Arizona, 4 pgs., Oct. 2003.
"Quad Analog Output Module Installation and User's Manual", by Honeywell International Inc., Phoenix, Arizona, pp. Ii, iii, iv and 1-12, Dec. 2003.
"Wireless Dual Analog Input Interface Transmitter Installation and User's Manual", by Honeywell International Inc., Phoenix, Arizona, pp. Ii-vi and 7-43, Dec. 2003.
"XYR 5000 Wireless Dual Analog Input Interface, Model Selection Guide", by Honeywell International Inc., Phoenix, Arizona, Dec. 2003.
"Wireless Measure, Monitor & Control", by Accutech, 4 pgs. May 2003.
"Wireless Instrumentation, Multi-Input Field Unit", by Accutech, 2 pgs., Dec. 2003.
"Quad Analog Output Module", by Accutech, 1 pg. Dec. 2003.
3 Pages from Website www.chemicalprocessing.com, Apr. 2004.
4 Pages from Website http://content.honeywell.com/imc/eznews/eznews0403/news.htm, 2004.
Official Communication in Application No. 05746241.8, filed May 5, 2005.
Official Action in Application No. 2006145434/09, filed May 5, 2005.
The first Office Action of Chinese patent application 200580006438.X, filed Mar. 2, 2005.
Examiner's consultation for European patent application 05 724 190.3, filed Mar. 2, 2005.
Second Office Action from Chinese patent application No. 200580014212.4, filed May 2005.
Notification of Transmittal of the International Search Report and the Written Opinion, PCT/US2007/019636, dated Oct. 1, 2008.
Invitation to Pay Additional Fees and Partial Search Report, PCT/US2007/019396, dated Oct. 7, 2008.
Official Action from Russian patent application No. 2008116682, dated Jan. 16, 2009.
Third Office Action from Chinese patent application No. 200580014212.4, dated Dec. 19, 2008.
Second Office Action from Chinese patent application No. 200580006438.X, dated Apr. 10, 2009.
First examination report for Indian application No. 3589/CHENP/2006, date Apr. 17, 2009.
Decision on refusal to grant a patent for invention for Russian patent application No. 2006145434, filed May 5, 2005.
Fourth Office Action for Chinese patent application No. 200580014212.4, dated Jul. 24, 2009.
Official Letter for Mexican patent application No. PA/A/2006/013488, dated Jun. 25, 2009.
Communication from European patent application No. 07837769.4, dated Jul. 14, 2009.
Second Official Action from Russian patent application No. 2008116682, filed Sep. 13, 2006.
Third Office Action from Chinese patent application No. 200580006438.X, dated Sep. 18, 2009.
English machine translation of JP2004208476 A.
"Every Little Helps," Economist, vol. 278, No. 8469, p. 78, Mar. 18, 2006.
"Thermal Design and Heat Sink Manufacturing & Testing—Total Thermal and Heat Sink . . . ," http://www.enertron-ein.com/enertron-products/integrated-heat-sink.php, Mar. 31, 2006.
Zahnd et al., "Piezoelectric Windmill: A Novel Solution to Remote Sensing," Japanese Journal of Applied Physics, v. 44, No. 3, p. L104-L105, 2005.
Office Action from U.S. Appl. No. 11/028,486, dated May 9, 2008.
First Office Action from Chinese patent application No. 200680015575.4, filed Jun. 27, 2006.

Third Official Action from Russian patent application No. 2008116682, dated Sep. 11, 2009.
Second Official Action from Russian patent application No. 2006145434, filed May 5, 2005.
First Communication from European patent application No. 06803540.1, dated Jun. 30, 2008.
First Office Action from Australian patent application No. 2005248759, dated Apr. 30, 2009.
Second Office Action from Australian patent application No. 2005248759, dated Aug. 28, 2009.
First Office Action from Chinese patent application No. 200580014212.4, filed May 21, 2004.
"Heat Pipe—Wikipedia, the free encyclopedia," http://en.wikipedia.org/wiki/Heat_pipe, Mar. 31, 2006.
Official Office Action from the Russian Patent Office for Application No. 2006134646/06.
USA & Metric Thread Standards http://www.carrlane.com/Catalog/index/cfm/29425071FOB221118070C1C513906103E05543B-0B05543B0B012009083C3B285357474A2D20609090C0015312-A36515F554A5B.
USA & Metric Thread Standards, http: www.carrlane.com/Catalog/index.cfm.
International Search Report and Written Opinion for application No. PCT/US2007/019396, dated Feb. 13, 2009.
International Search Report and Written Opinion for application No. PCT/US2005/006596, dated Sep. 6, 2005.

Second Examination Report for Indian patent application No. 3589/CHENP/2006, dated Dec. 17, 2009.
First Communication issued for European patent application No. 07 837 963.3, dated Sep. 4, 2009.
Fourth Official Action for Russian patent application No. 2008116682, dated Dec. 18, 2009.
First Office Action for Chinese patent application No. 200680035248.5, dated Nov. 6, 2009.
Communication from European Patent Office dated Mar. 2, 2010 for European application No. 06 803 540.1.
Foundation Fieldbus Power Supply, A Look at Powering Fieldbus, www.analogservices.com/fbsupp2.pdf, Oct. 22, 2000.
Fourth Office Action from Chinese application No. 2005/80006438.X dated May 17, 2010.
Office Action for Japanese patent application No. 2007-501903, dated Jan. 20, 2010.
Notice of Opposition for European patent No. 1721067 dated Sep. 13, 2010.
Translation of the Notice of Opposition for European patent No. 1721067 dated Sep. 13, 2010.
Second Office Action for Chinese patent application No. 2007800357888 dated Oct. 9, 2010.
Rejection Notice for Japanese patent application No. 2007-501903 dated Oct. 27, 2010.

* cited by examiner

PROCESS DEVICE WITH IMPROVED POWER GENERATION

CROSS-REFERENCE TO RELATED APPLICATIONS

The present application is based on and claims the benefit of U.S. provisional patent application Ser. No. 60/549,637, filed Mar. 2, 2004, and entitled SELF POWERED WIRELESS TRANSMITTERS, the content of which is hereby incorporated by reference in its entirety.

BACKGROUND OF THE INVENTION

The present invention relates to industrial process control and monitoring systems. More specifically, the present invention relates to the generation of electrical power for field devices within such systems.

In industrial settings, control systems are used to monitor and control inventories of industrial and chemical processes, and the like. Typically, the control system performs these functions using field devices distributed at key locations in the industrial process and coupled to the control circuitry in the control room by a process control loop. The term "field device" refers to any device that performs a function in a distributed control or process monitoring system, including all devices used in the measurement, control and monitoring of industrial processes.

Field devices are used by the process control and measurement industry for a variety of purposes. Usually such devices have a field-hardened enclosure so that they can be installed outdoors in relatively rugged environments and are able to withstand climatalogical extremes of temperature, humidity, vibration, mechanical shock, etc. These devices also can typically operate on relatively low power. For example, field devices are currently available that receive all of their operating power from a known 4-20 mA loop.

Some field devices include a transducer. A transducer is understood to mean either a device that generates an output signal based on a physical input or that generates a physical output based on an input signal. Typically, a transducer transforms an input into an output having a different form. Types of transducers include various analytical equipment, pressure sensors, thermistors, thermocouples, strain gauges, flow transmitters, positioners, actuators, solenoids, indicator lights, and others.

Typically, each field device also includes communication circuitry that is used for communicating with a process control room, or other circuitry, over a process control loop. In some installations, the process control loop is also used to deliver a regulated current and/or voltage to the field device for powering the field device.

Traditionally, analog field devices have been connected to the control room by two-wire process control current loops, with each device connected to the control room by a single two-wire control loop. Typically, a voltage differential is maintained between the two wires within a range of voltages from 12-45 volts for analog mode and 9-50 volts for digital mode. Some analog field devices transmit a signal to the control room by modulating the current running through the current loop to a current proportional to the sensed process variable. Other analog field devices can perform an action under the control of the control room by controlling the magnitude of the current through the loop. In addition to, or in the alternative, the process control loop can carry digital signals used for communication with field devices. Digital communication allows a much larger degree of communication than analog communication. Moreover, digital devices also do not require separate wiring for each field device. Field devices that communicate digitally can respond to and communicate selectively with the control room and/or other field devices. Further, such devices can provide additional signaling such as diagnostics and/or alarms.

In some installations, wireless technologies have begun to be used to communicate with field devices. Wireless operation simplifies field device wiring and setup. Wireless installations are currently used in which the field device is manufactured to include an internal battery, potentially charged by a solar cell without any sort of wired connection. Problems exist in using an internal battery as the energy demands of wireless devices may vary greatly depending on numerous factors such as the device reporting rate, device elements, et cetera.

Difficulties also arise in installations where solar power is not reliable. For example, it becomes problematic to use solar power in areas that experience full shade twenty-four hours a day, indoors seven days a week, or in parts of the world where solar insolation numbers are very small, such as in the Arctic Circle. Accordingly, in these installations, powering a wireless process device using solar power is not reliable. Accordingly, there is an ongoing significant need for wireless process devices that can operate using an abundant renewable source of power that is not dependent upon the sun.

SUMMARY OF THE INVENTION

A wireless field device is disclosed. The field device includes a wireless communications module and an energy conversion module. The wireless communications module is configured to wirelessly communicate process-related information with another device. The energy conversion module is coupled to the wireless communications module. The energy conversion module is configured to couple to a thermal source, and to generate electricity from thermal potential energy in the thermal source.

A field device includes a controller, a wireless communications module, and a power generation module. The wireless communications module is coupled to the controller. The power generation module is located within the field device, and is coupled to the controller and to the wireless communications module. The power generation module is configured to interact with molecules proximate the exterior of the field device to generate electricity. The power generation module is preferably a thermal generator that harvests energy from a temperature differential near the field device.

DETAILED DESCRIPTION OF THE PREFERRED EMBODIMENTS

Figure 1:
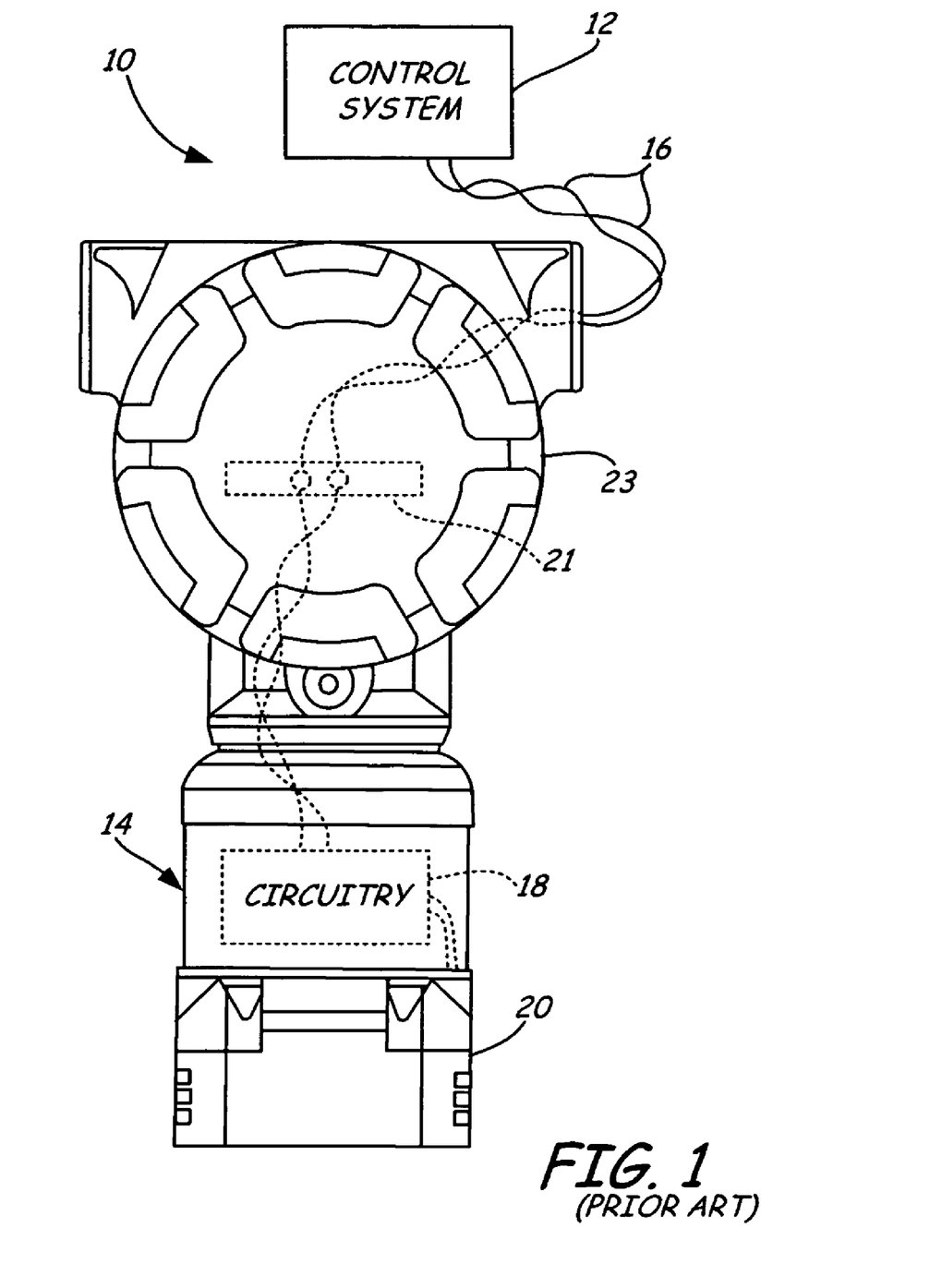
FIG. 1 is a diagrammatic view of an exemplary field device with which embodiments of the present invention is particularly useful.
Figure 2:
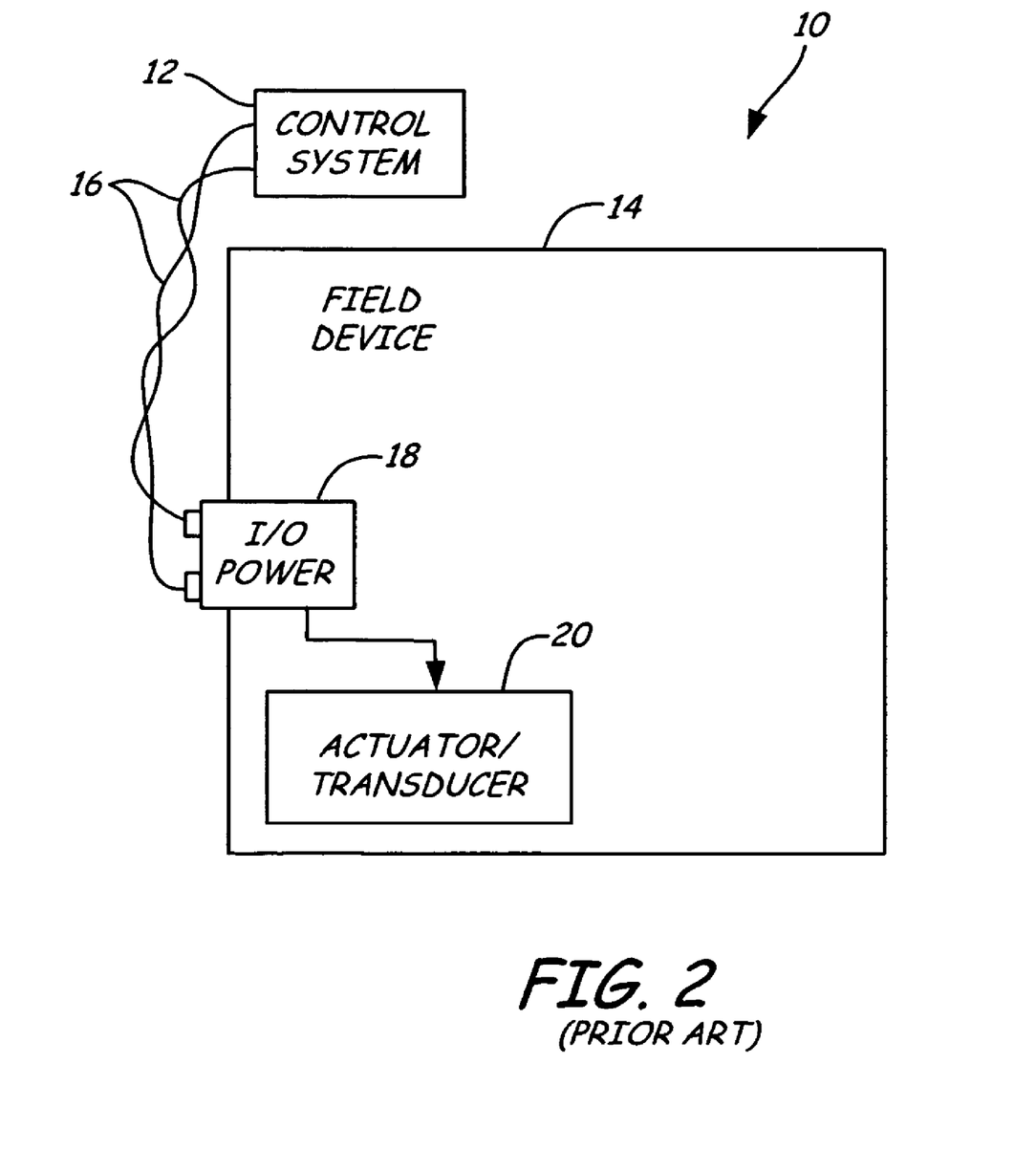
FIG. 2 is a block diagram of the field device shown in FIG. 1.

FIGS. 1 and 2 are diagrammatic and block diagram views of an exemplary field device with which embodiments of the present invention are useful. Process control or monitoring system 10 includes a control room or control system 12 that couples to one or more field devices 14 over a two-wire process control loop 16. Examples of process control loop 16 include analog 4-20 mA communication, hybrid protocols which include both analog and digital communication such as the Highway Addressable Remote Transducer (HART®) standard, as well as all-digital protocols such as the FOUNDATION™ Fieldbus standard. Generally process control loop protocols can both power the field device and allow communication between the field device and other devices.

In this example, field device 14 includes circuitry 18 coupled to actuator/transducer 20 and to process control loop 16 via terminal board 21 in housing 23. Field device 14 is illustrated as a process variable (PV) generator in that it couples to a process and senses an aspect, such as temperature, pressure, pH, flow, et cetera of the process and provides an indication thereof. Other examples of field devices include valves, actuators, controllers, and displays.

Generally field devices are characterized by their ability to operate in the "field" which may expose them to environmental stresses, such as temperature, humidity and pressure. In addition to environmental stresses, field devices must often withstand exposure to corrosive, hazardous and/or even explosive atmospheres. Further, such devices must also operate in the presence of vibration and/or electromagnetic interference.

Figure 3:
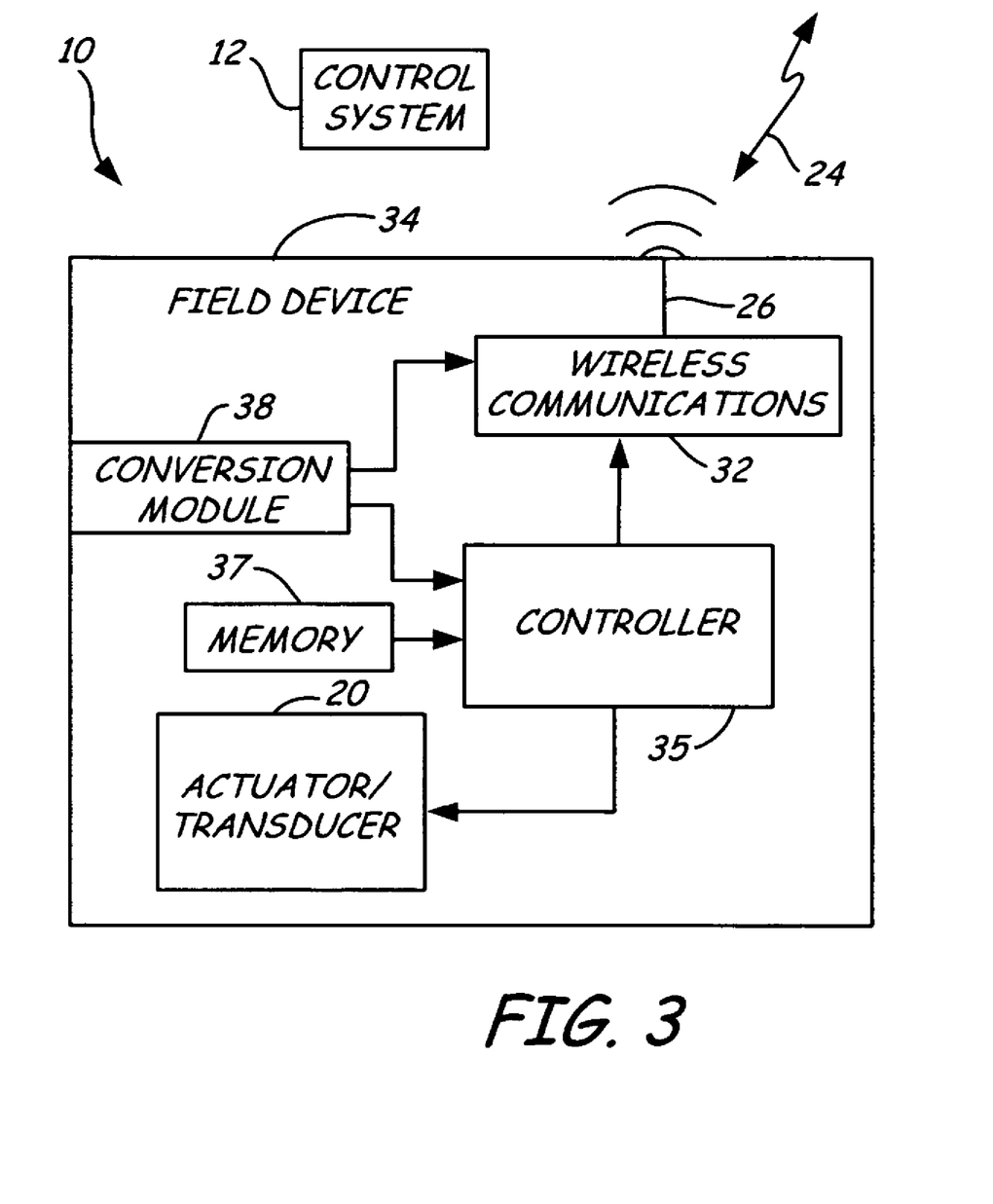
FIG. 3 is a block diagram of a field device including wireless communication circuitry for communicating with a remote device.

FIG. 3 is a block diagram of a wireless field device in accordance with an embodiment of the present invention. Field device 34 includes power conversion module 38, controller 35, wireless communications module 32, and actuator/transducer 20. Conversion module 38 can be any device that is able to convert thermal potential energy from the process into electrical energy. Conversion module 38 can be any device, known or later developed, that translates thermal potential energy available from molecules proximate field device 34 into electricity. For example, module 38 can employ known thermopile devices to generate electricity from disparate temperatures using the Peltier Effect. Other temperature-based conversion devices can be used for module 38. Such devices include thermoelectric diodes; solid state thermogenerators; and semiconductor thermoelectric generators. Moreover, any device now known, or later developed, that converts thermal potential energy to electricity may be used as or in combination with module 38. Conversion module 38 can provide power for wireless communications module 32 alone, other portions of field device 34, or even all of the components within field device 34.

Wireless communication module 32 is coupled to controller 35 and interacts with external wireless devices via antenna 26 based upon commands and/or data from controller 35. Wireless communication 32 can communicate process-related information as well as device-related information. Depending upon the application, wireless communication module 32 may be adapted to communicate in accordance with any suitable wireless communication protocol including, but not limited to: wireless networking technologies (such as IEEE 802.11b wireless access points and wireless networking devices built by Linksys of Irvine, Calif.), cellular or digital networking technologies (such as Microburst® by Aeris Communications Inc. of San Jose, Calif.), ultra wide band, free space optics, Global System for Mobile Communications (GSM), General Packet Radio Service (GPRS), Code Division Multiple Access (CDMA), spread spectrum technology, infrared communications techniques, SMS (Short Messaging Service/text messaging), or any other suitable wireless technology. Further, known data collision technology can be employed such that multiple units can coexist within wireless operating rage of one another. Such collision prevention can include using a number of different radio-frequency channels and/or spread spectrum techniques.

Wireless communication module 32 can also include transducers for a plurality of wireless communication methods. For example, primary wireless communication could be performed using relatively long distance communication methods, such as GSM or GPRS, while a secondary, or additional communication method could be provided for technicians, or operators near the unit, using for example, IEEE 802.11b or Bluetooth.

Some wireless communications modules may include circuitry that can interact with the Global Positioning System (GPS). GPS can be advantageously employed in device 34 for mobile devices to allow finding the individual device 34 in a remote location. However, location sensing based upon other techniques can be used as well.

Memory 37 is illustrated in FIG. 3 as being separate from controller 35, but may, in fact, be part of controller 35. Memory 37 can be any suitable type of memory including volatile memory (such as Random Access Memory), non-volatile memory (such as flash memory, EEPROM memory, etc.) and any combination thereof. Memory 37 may contain program instructions for controller 35 as well as any suitable administrative overhead data for device 34. Memory 37 may contain a unique identifier for device 34, such that device 34 can distinguish wireless communications meant for it among other wireless communications. Examples of such an identifier could include, a Media Access Controller (MAC) address, Electronic Serial Number, global phone number, Internet Protocol (IP) address, or any other suitable identifier. Moreover, memory 37 may include information about attached field devices, such as their unique identifiers, configurations, and abilities. Finally, controller 35, using memory 37 can cause the output of device 34 to be provided in any suitable form. For example, configuration and interaction with field device 34 and/or one or more associated field devices could be provided as HyperText Markup Language (HTML) web pages.

Figure 4:
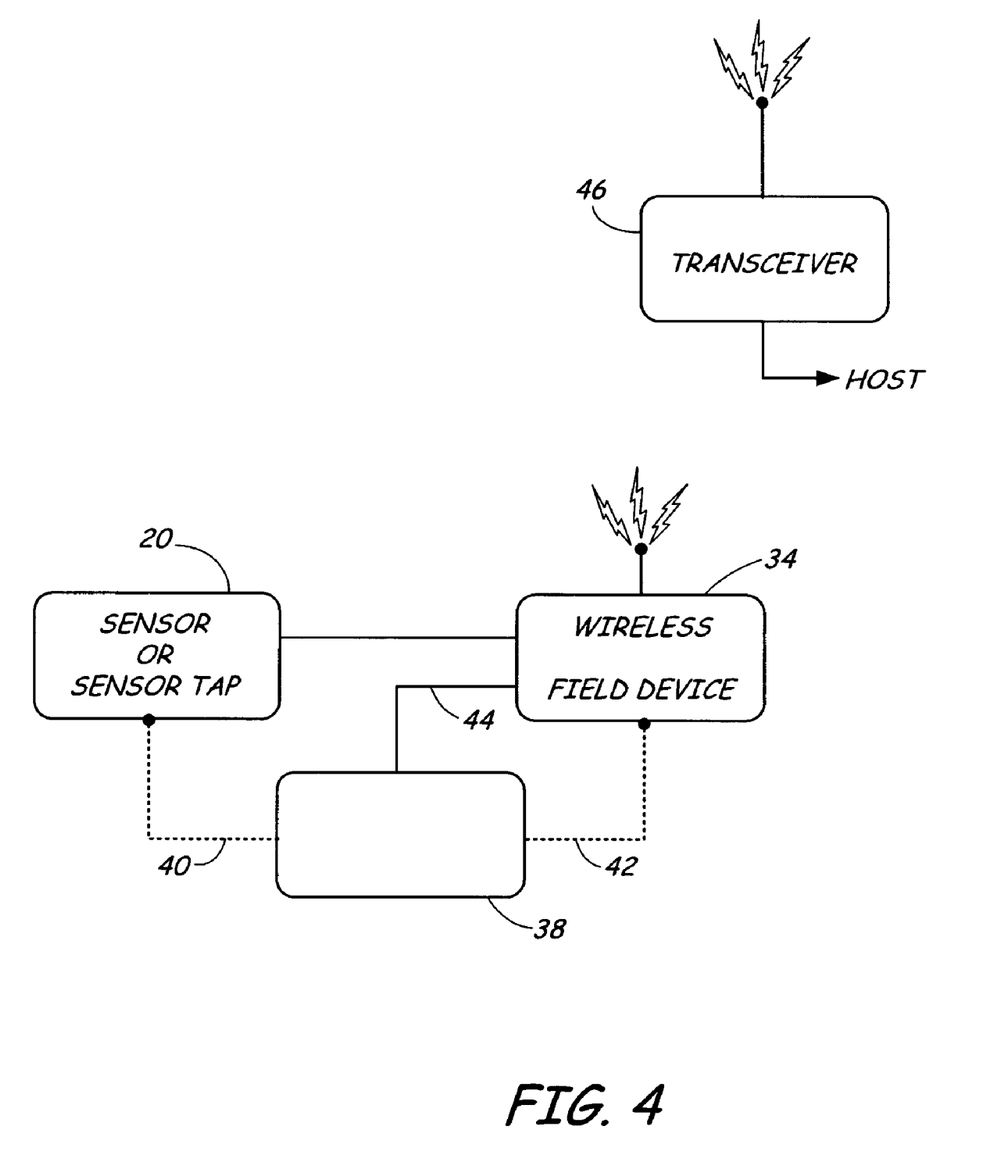
FIG. 4 is a diagrammatic view of a wireless field device operating in accordance with an embodiment of the present invention.

FIG. 4 is a diagrammatic view of a wireless field device operably coupled to energy conversion module 38 in accordance with an embodiment of the present invention. In the embodiment illustrated in FIG. 4, module 38 is disposed external to field device 34. Additionally, transducer 20 is illustrated in FIG. 4 as being a sensor. The sensor or sensor tap 20 and wireless field device 34 are, by virtue of the process to which they are coupled, maintained at a differential temperature. For example, sensor 20 may be coupled to process fluid that is at a higher temperature than the ambient temperature to which device 34 is exposed. Conversion module 38 is thermally coupled, illustrated by phantom lines 40, 42 to sensor 20 and field device 34, respectively. The differential temperature coupled to conversion module 38 generates electricity within conversion module 38 that is provided to wireless field device 34 via line 44. When so powered, field device 34 generates and transmits wireless information to one or more remote transceivers 46, which may, in fact, be part of control system 12.

Given that conversion module 38 generally transforms thermal potential energy in or near the process fluid to electricity, one particularly synergistic application for embodiments of the present invention is that of temperature measuring field devices. In such embodiments, sensor 20 is a temperature sensor, such as a thermocouple, thermistor, or resistance temperature device (RTD). While embodiments of the present invention will be described with respect to a temperature-sensing field device, embodiments of the present invention are practicable with any field device.

Figure 5A:
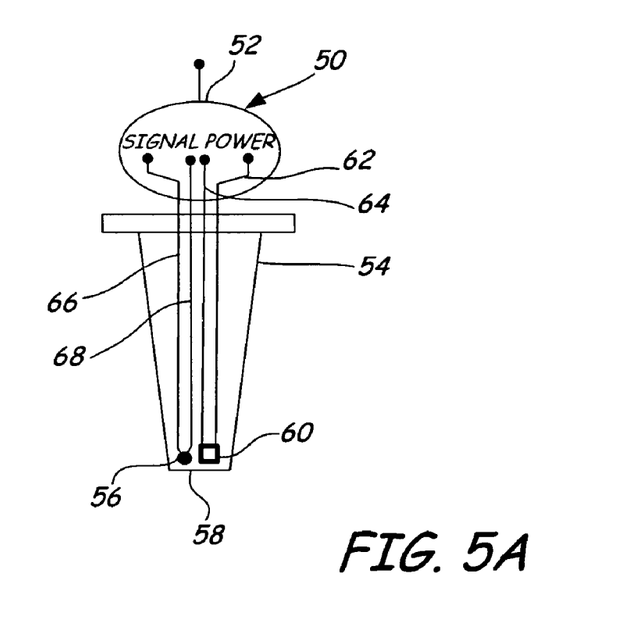
FIGS. 5A and 5B are diagrammatic views of a temperature-sensing field device deriving power in accordance with embodiments of the present invention.

FIGS. 5A and 5B are diagrammatic views of field devices deriving power from thermal energy in accordance with embodiments of the present invention. FIG. 5A illustrates a temperature-sensing field device 50 having an electronics compartment 52 coupled to a thermowell 54 which is shaped, or otherwise configured, to engage a process fluid. Within thermowell 54, a temperature sensor 56 provides an indication of process fluid temperature proximate end 58 of thermowell 54. Additionally, a portion of conversion module 38 (shown in FIG. 4) is disposed proximate end 58. Specifically, device 60 is disposed proximate end 58 and electrically coupled to electronics compartment 52 via power lines 62, 64. Device 60 is preferably any suitable device that converts thermal energy into electricity. Thus, device 60 may be a thermopile, thermodiode (thermoelectric diode), a solid state thermogenerator, a semiconductor thermoelectric generator, or any combination thereof. Temperature sensing of field device 50 is accomplished via temperature sensor 56 providing a signal on signal lines 66 and 68 to electronics compartment 52.

Figure 5B:
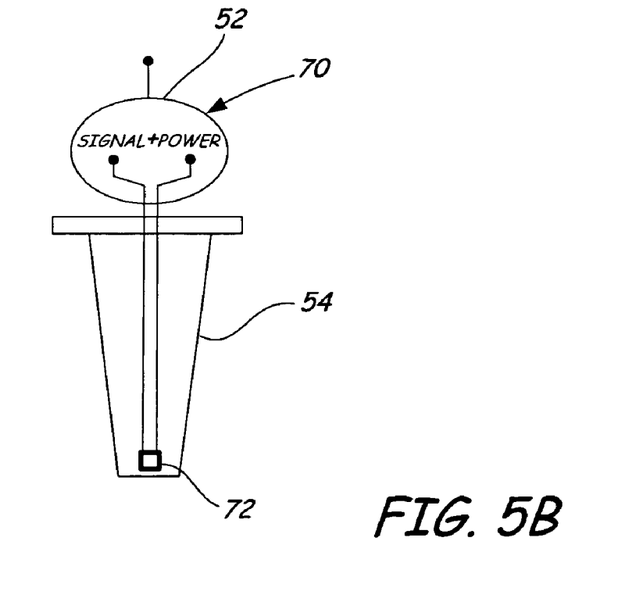

FIG. 5B illustrates field device 70 having an electronics compartment 52 and a thermowell 54. In contrast to field device 50, field device 70 employs device 72 that generates electricity related to the temperature to which it is exposed. Examples of suitable devices for device 72 include a thermopile or a thermoelectric diode. Such devices are suitable because they do not require a heat flow through the device, but instead generate electricity based upon exposure to a specific thermal source.

Technology advancements are currently increasing the feasibility of a field device such as that illustrated in FIGS. 5A and 5B. On the power generation side, solid state thermogenerators are becoming more and more efficient. Additionally, advancements in wireless technology are also increasing the feasibility of such field devices. Specifically, wireless transmitters need less and less power to cover the same area. Additionally, even in embodiments where the transmission distance of a specific field device may be limited, such as to a radius of approximately 20 meters, embodiments of the present invention contemplate the use of repeating or mesh networks to increase the area covered by such devices. Thus, where a plurality of wireless field devices are disposed within the wireless transmission radius from one another, a first device can have its wireless information relayed by a second device thus extending the net range of the first device by that of the second device.

Figure 6A:
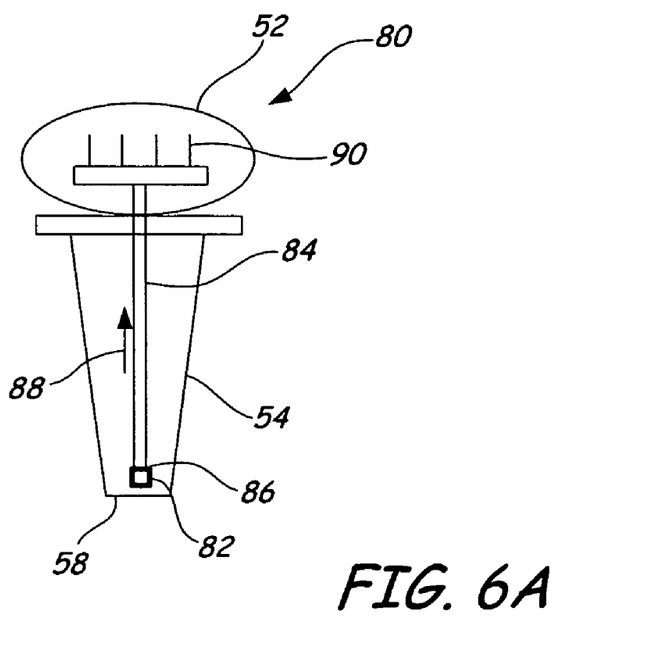
FIGS. 6A and 6B are diagrammatic views of a field device deriving power from a semiconductor thermoelectric generator in accordance with embodiments of the present invention.
Figure 6B:
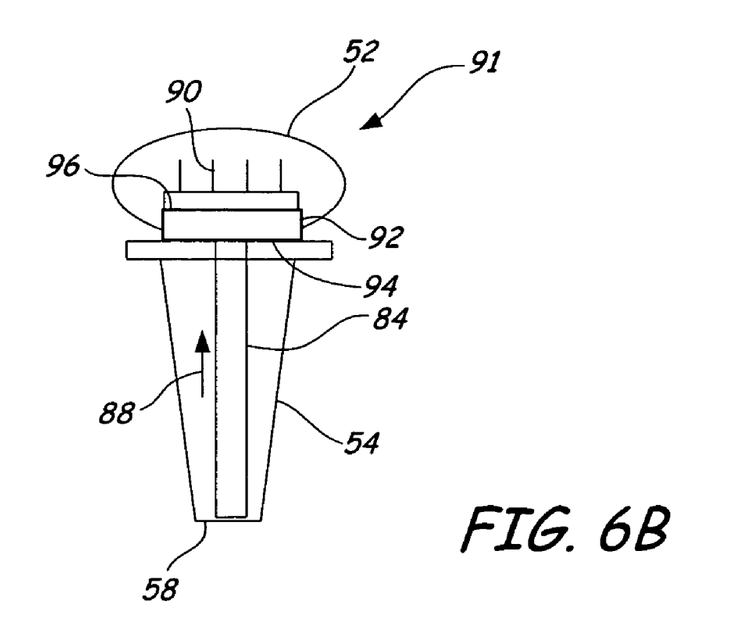

FIGS. 6A and 6B illustrate field devices that employ a semiconductor thermoelectric generator for thermoenergy scavenging in accordance with embodiments of the present invention. Semiconductor thermoelectric generators produce power when a temperature difference is maintained across the device. Thus, there is a flow of heat through the device, so the cool side should be properly heat sunk for advantageous power generation.

In FIG. 6A, field device 80 includes electronics compartment 52 and thermowell 54 having a semiconductor thermoelectric generator device 82 disposed proximate distal end 58 of thermowell 54. In order to allow device 52 to have heat flow therethrough, a thermal conductor 84, such as a heat conducting member, is coupled to cold side 86 of device 82 and conveys heat in the direction of arrow 88 to one or more optional cooling fins 90 that, in some embodiments, may be disposed within electronics compartment 52. Conductor 84 may be any arrangement that conveys heat efficiently. For example, conductor 84 could be a copper rod.

FIG. 6B illustrates an alternate arrangement for generating electricity from thermoenergy. Field device 91 includes electronics compartment 52 and thermowell 54. However, semiconductor thermoelectric generator device 92 is disposed above thermowell 54 proximate electronics compartment 52. This allows device 92 to be relatively larger in comparison to device 82. In order to maintain advantageous heat flow across device 92, thermal conductor 84 is still coupled thermally to distal end 58 and conveys heat in the direction of arrow 88 to hot side 94 of device 92. The cold side 96 of device 92 is coupled to one or more optional cooling fins 90 that may or may not be disposed within housing 52.

As illustrated in FIGS. 6A and 6B, there are different ways to conceptually achieve thermal flow across a semiconductor thermoelectric element. While FIGS. 6A and 6B illustrate a pair of examples, other possibilities may be practiced in accordance with embodiments of the present invention. In fact, the thermoelectric power generation element need not be disposed proximate the field device itself.

Figure 7:
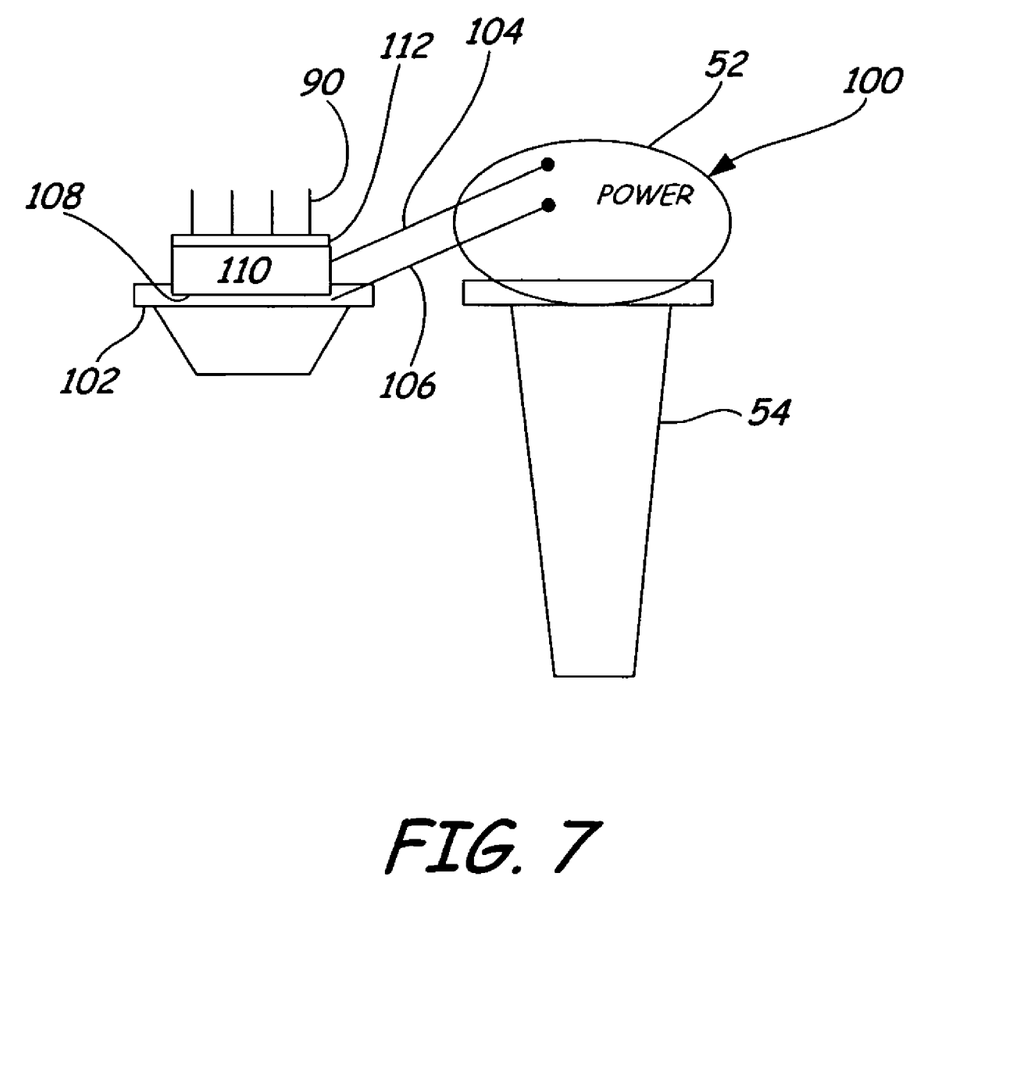
FIG. 7 is diagrammatic view of a field device deriving power from a semiconductor thermoelectric generator in accordance with an embodiment of the present invention.

FIG. 7 illustrates a diagrammatic view of field device 100 having an electronics compartment 52 coupled to a thermowell 54 for sensing a process temperature. A thermoelectric power-generating device 102 is disposed remote from field device 100 and coupled thereto via power conductors 104, 106. An elevated process temperature is coupled to hot side 108 of semiconductor thermoelectric generator device 110, which has one or more optional fins 90 coupled to its cold side 112. Since device 102 is mounted remote from field device 100, the physical size of device 102 is not constrained at all by the design of field device 100. This is advantageous because typically only small thermoelectric generating devices will fit within thermowell 54. Commercially available thermoelectric generating devices having a size on the order of 2 mm by 4 mm by 2 mm thick are believed to be able to fit within the thermowell, and to generate approximately 48 milivolts and 80 miliamps with a 50° C. temperature different across hot and cold sides. This generated voltage is generally low and preferably is stepped up with a step up voltage conversion circuit known in the art of field devices. Accordingly, approximately 0.22 watts of heat flow through the thermoelectric generator device under such conditions. Although the operating efficiency is relatively low (approximately 2%) the approximately 4 milliwatts of generated power is believed to be sufficient for wireless field device operation.

However, if the thermoelectric generating device is disposed remote from the field device, it is reasonable that the thermoelectric generating device could be sized much larger than the example given above. Specifically, thermoelectric generating devices having a size of approximately 15 mm by 15 mm by 2 mm thick can be used. Such devices are commercially available and believed to generate 375 millivolts and 300 milliamps for the same 50° C. difference. While a step up voltage conversion circuit is still useful, the approximate 112 milliwatts of generated power makes the design of such a circuit much simpler and lower cost. Approximately 6 watts of heat flow through the thermoelectric generating device under such conditions.

The conversion module can include, or be coupled to, additional power circuitry to provide additional functions related to power generation and/or storage. For example, a storage device, such as a capacitor or rechargeable cell can be operably coupled to the conversion module to maintain power levels when the amount of power available from the conversion module (via the thermal source) drops below that which could minimally operate the field device, or portions thereof. Additionally, any known power conditioning circuitry can be used to step up the voltage, remove noise from the power signal, isolate the power signal, smooth and/or otherwise shape the power signal. However, those skilled in the art will recognize that any desired functions can be accommodated with power conditioning circuitry as desired.

Although the present invention has been described with reference to preferred embodiments, workers skilled in the art will recognize that changes may be made in form and detail without departing from the spirit and scope of the invention.

What is claimed is:

1. A field device system comprising:
    a field device having a field-hardened enclosure, the field device including;
        a wireless communications module disposed within the field-hardened enclosure and configured to wirelessly communicate process-related information with another device;
        a controller disposed within the field-hardened enclosure, the controller being coupled to the wireless communication module;
        memory disposed within the field-hardened enclosure and coupled to the controller;
    a temperature sensor operably coupled to the controller of the field device;
    a thermowell configured to couple to a process fluid, the thermowell containing the temperature sensor;
    an energy conversion module coupled to the wireless communications module and the controller of the field device, the energy conversion module having a semiconductor thermoelectric generator configured to couple to a process fluid, and to convert thermal potential energy in the process fluid into electricity to power circuitry within the field device, the thermoelectric generator having a hot side and a cold side, the hot side configured to thermally couple to the process fluid; and
    a heat conducting member disposed at least partially within the thermowell and configured to convey heat away from the process fluid, the heat conducting member having a first end and a second end, the first end thermally coupled to the thermoelectric generator cold side and the second end thermally coupled to at least one cooling fin.

2. The field device system of claim 1, wherein the energy conversion module is disposed proximate the field device.

3. The field device system of claim 1, wherein the energy conversion device is disposed remote from the field device.

4. The field device system of claim 1, wherein the temperature sensor generates electricity and is a component of the energy conversion module.

5. The field device system of claim 1, wherein the amount of electricity converted by the conversion module is used to provide a temperature indication related to the thermal source.

6. The field device system of claim 1, and further comprising a power storage device coupled to the conversion module.

7. The field device system of claim 1, wherein the at least one cooling fin is located within the field-hardened enclosure.

8. The field device system of claim 1, wherein the at least one cooling fin is located outside of the field-hardened enclosure.

9. The field device system of claim 1, wherein the at least one cooling fin comprises a plurality of cooling fins.

10. A field device system comprising:
    a field device having a field-hardened enclosure, the field device including;
        a wireless communications module disposed within the field-hardened enclosure and configured to wirelessly communicate process-related information with another device;
        a controller disposed within the field-hardened enclosure, the controller being coupled to the wireless communication module;
        memory disposed within the field-hardened enclosure and coupled to the controller;
    a temperature sensor operably coupled to the controller of the field device;
    a thermowell configured to couple to a process fluid, the thermowell containing the temperature sensor;
    a heat conducting member disposed at least partially within the thermowell, the heat conducting member having a first end and a second end, the first end configured to thermally couple to the process fluid and to convey heat away from the process fluid; and
    an energy conversion module coupled to the wireless communications module and the controller of the field device, the energy conversion module having a semiconductor thermoelectric generator configured to couple to the process fluid, and to convert thermal potential energy in the process fluid into electricity to power circuitry within the field device, the thermoelectric generator having a hot side and a cold side, the hot side thermally coupled to the second end of the heat conducting member and the cold side thermally coupled to at least one cooling fin.

11. The field device system of claim 10, wherein the at least one cooling fin is located within the field-hardened enclosure.

12. The field device system of claim 10, wherein the at least one cooling fin is located outside of the field-hardened enclosure.

13. The field device system of claim 10, wherein the at least one cooling fin comprises a plurality of cooling fins.

14. A field device system comprising:
    a field device having a field-hardened enclosure, the field device including;
        a wireless communications module disposed within the field-hardened enclosure and configured to wirelessly communicate process-related information with another device;
        a controller disposed within the field-hardened enclosure, the controller being coupled to the wireless communication module;
        memory disposed within the field-hardened enclosure and coupled to the controller;
    a temperature sensor operably coupled to the controller of the field device;
    a thermowell configured to couple to a process fluid, the thermowell containing the temperature sensor; and
    an energy conversion module coupled to the wireless communications module and the controller of the field device, the energy conversion module having a semiconductor thermoelectric generator configured to convert thermal potential energy in the process fluid into electricity to power circuitry within the field device, the thermoelectric generator having a hot side and a cold side, the hot side configured to thermally couple to the process fluid and the cold side thermally coupled to at least one cooling fin.

15. The field device system of claim 14, wherein the at least one cooling fin is located within the field-hardened enclosure.

16. The field device system of claim 14, wherein the at least one cooling fin is located outside of the field-hardened enclosure.

17. The field device system of claim 14, wherein the at least one cooling fin comprises a plurality of cooling fins.

* * * * *